United States Patent
Kulaga et al.

(10) Patent No.: US 11,792,212 B2
(45) Date of Patent: Oct. 17, 2023

(54) IOC MANAGEMENT INFRASTRUCTURE

(71) Applicant: Acronis International GmbH, Schaffhausen (CH)

(72) Inventors: Andrey Kulaga, Moscow (RU); Danil Cherepanov, Moscow (RU); Nikolay Grebennikov, Singapore (SG); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 161 days.

(21) Appl. No.: 17/304,944

(22) Filed: Jun. 29, 2021

(65) Prior Publication Data
US 2022/0417259 A1    Dec. 29, 2022

(51) Int. Cl.
*G06F 21/00* (2013.01)
*H04L 9/40* (2022.01)

(52) U.S. Cl.
CPC ........ *H04L 63/1416* (2013.01); *H04L 63/145* (2013.01); *H04L 63/1425* (2013.01); *H04L 63/20* (2013.01)

(58) Field of Classification Search
CPC ..... H04L 63/108; H04L 63/20; H04L 63/102; H04L 63/08; G06F 21/50; G06F 21/6218
USPC .......................................................... 726/1
See application file for complete search history.

(56) References Cited

U.S. PATENT DOCUMENTS

| | | |
|---|---|---|
| 9,900,335 B2 | 2/2018 | Desch et al. |
| 9,985,982 B1 | 5/2018 | Bartos et al. |
| 11,012,448 B2 | 5/2021 | Young et al. |
| 11,245,730 B2 * | 2/2022 | Bailey ............... H04L 63/1441 |
| 2021/0092135 A1 | 3/2021 | Strogov et al. |
| 2021/0117544 A1 * | 4/2021 | Kurtz .................. G06F 21/566 |
| 2021/0144178 A1 | 5/2021 | Bailey |

FOREIGN PATENT DOCUMENTS

CN             107391598         11/2017

* cited by examiner

*Primary Examiner* — Longbit Chai
(74) *Attorney, Agent, or Firm* — ESPE Legal Consultancy FZ-LLC

(57) ABSTRACT

The IOC Infrastructure management system (100) and method is disclosed for building an IOC infrastructure and its management thereof. The system mainly includes a IOC processing unit and an endpoint engine. The IOC processing unit is configured to i) source raw IOCs from a plurality of external sources, ii) convert format of the raw IOCs into a predetermined format of an IOC database using a parser unit, where each parser of the parser unit corresponds to at least one IOC format, iii) build and apply syntax tree to the parsed IOCs, where the syntax tree supports complex expression-based toolsets, such as YARA, and sort the IOCs lexicographically to avoid duplication of IOC entry and render the malware detection scanning process faster and efficient.

8 Claims, 4 Drawing Sheets

IOC MANAGEMENT INFRASTRUCTURE

FIELD OF THE INVENTION

The present disclosure generally relates to data security management, and particularly, but not limitedly, to a system and method for malware detection and data protection using an Indicator of Compromise database with a syntax tree.

BACKGROUND

With stupendous advancement in digital technology, the data security has become a key concern. Constantly updating malware forms is a pervasive problem that results in successful malware attacks, changing threat definitions, compromising critical data and so on. Data security is normally defended using various malware detection units; usually classified as malware detection programmable components and security components. Data analysis can be performed by the malware detection programmable component at various levels of the computing system, such as user space, kernel space, and emulator. The analysis can be performed on individual processes, specific applications, system functions, and entire operating system. Files, threads, and registry operations are supported as types of analysis. If the malware attack is detected, the security components can perform corrective actions to block any communication with the malware.

Malware detection units usually are configured to identify Indicators of compromise (IOCs). IOC is a piece of forensic data, such as the data found in system log entries or files, that identifies potentially malicious activity on a system or a network. IOCs are of different formats, different definitions, different types with which the data collected from the computing system is compared with, and if any piece of evidence is found that matches with at least one IOC, the malware attack, data breach, malware infection or other threat activity is confirmed. By monitoring IOCs against an IOC database, users can detect malware attacks and perform preventive or corrective actions to prevent data breaches from occurring or limit damages by stopping malware attacks in earlier stages.

IOCs can be used in combination with human intelligence and are designed to help threat detection and investigation. IOCs are of different formats, such as ioc, yar, csv, xml, txt, j son, Rules, Stix, and others. Different types of IOCs are aggregated at various free community driven platforms that are constantly updated with IoC in listed formats, thereby providing quality threat intelligence to the data security community in order to render efficient threat database to be used in conjunction with human intelligence. There are multiple rules for identifying IOC attributes and classifying malware samples. One example of a tool of such rules includes, but not limited to, YARA, using which the user can create descriptions of malware classification based on textual or binary patterns. Each rule defines a set of strings and a boolean expression which determines its logic.

In the current state of the art, a method based on IOC Intelligence extraction and sharing is disclosed. The method includes IOC extraction and uploading the IOCs to IOC acquisition and filtering module. The IOC acquisition and filtering module matches the latest IOC data with the existing IOC data in the cloud IOC information centre module, and synchronizes the latest IOC data. If IOC detection module detects a match, an alarm is generated.

In current state of the art, extracting IOCs and matching the IOCs with the IOC database is disclosed. Updating and tracking the IOC database is also implemented in the art. Such databases support multiple formats and configured for regular updates. However, there is a strong possibility of duplication of the IOCs. Attributes of IOCs can be processed multiple times, which may lead to more time taken for the scanning machine resulting in less effective malware detection process. Therefore, it is required to build an IOC infrastructure for IOC management, which is embedded with a set of rules for parsing and classifying IOCs and a syntax tree to process parsed IOCs.

The present disclosure describes IOC infrastructure for management of IOCs received from known sources, updating, sorting and parsing the IOCs in the database and using a syntax tree to process parsed IOCs. The particular subject matter prevents duplication of the IOCs and multiple scanning of the attributes resulting in a faster and efficient malware scanning process.

SUMMARY

Embodiments and technical aspects disclosed herein relate to a system and method for data security management using IOC infrastructure embedded with a syntax tree.

In one embodiment, a method is implemented on an IOC infrastructure management system for updating IOC infrastructure. The method mainly comprises receiving a plurality of raw IOCs from a plurality of external known and trusted sources, by an IOC processing unit over the communication interface. The data analytic device may include a database of known IOCs, where the IOCs sourced from the external service may be received. According to one aspect of the instant embodiment, each raw IOC from amongst the plurality of raw IOCs can be in the same format as any other raw IOCs from amongst the plurality of raw IOCs. According to another aspect of the instant embodiment, each raw IOC from amongst the plurality of raw IOCs can be in a different format from any other raw IOCs from amongst the plurality of raw IOCs.

In accordance with the preferred embodiment, the method further includes converting, by an IOC parser unit, each raw IOCs into a predetermined IOC format. The IOCs may have been of different formats; however, all IOCs are converted into a unified format. According to one aspect, attributes of the predetermined IOC format are equivalent to attributes of different formats of the raw IOCs.

According to the preferred embodiment, the method further includes building a syntax tree, by a syntax tree unit, using converted IOCs. As the converted IOCs are parsed and saved in the database in the unified format, a syntax format as described in the syntax tree is applied to the IOCs. The syntax tree is configured with a set of syntax operators to control complexity of IOCs and prevent duplication of the attribute scanning.

The method further includes, in accordance with the preferred embodiment, updating a master IOC database with all converted IOCs and the syntax tree.

BRIEF DESCRIPTION OF DRAWINGS

A better understanding of embodiments of the present disclosure (including alternatives and/or variations thereof) may be obtained with reference to the detailed description of the embodiments along with the following drawings, in which.

DETAILED DESCRIPTION

Figure 1:
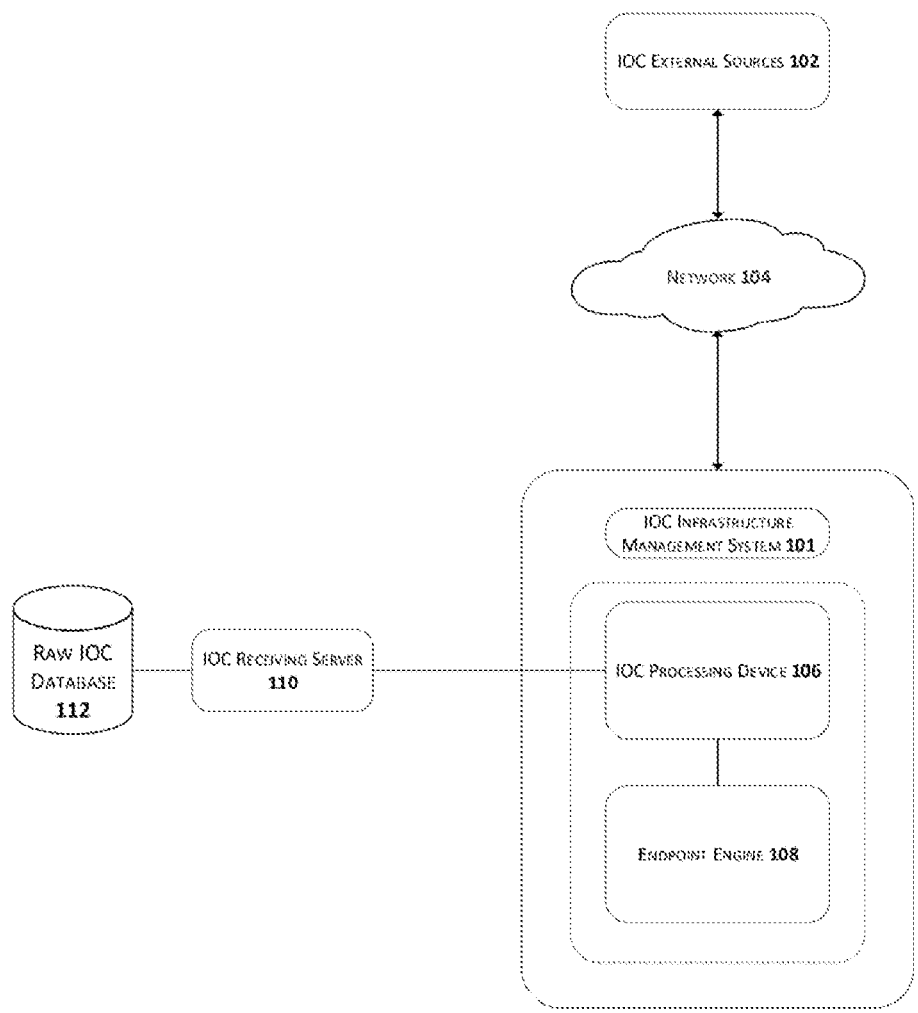
FIG. 1 illustrates an exemplary environment 100 for implementing IOC Infrastructure Management System, according to an embodiment of the present disclosure.

In general, this disclosure describes systems, methods, devices, and other techniques for receiving raw Indicators of compromise ("IOCs"), converting the IOCs into unified format, parsing and sorting the IOCs with applied syntax tree to identify computing systems that have been compromised. A system can enable users, such as researchers, incident responders, information technology professionals, and other users, to upload and share IOCs that can be used to identify compromised computing systems. An IOC can specify one or more characteristics of a computer security threat. The one or more security threats specified by a particular indicator of compromise can include multiple security threats that all belong to a same category of security threat. The one or more security threats specified by a particular indicator of compromise can include multiple security threats that are variants of each other.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "above," "below," and the like, are words of convenience and are not to be construed as limiting terms unless expressly state otherwise.

Malware threats can be found in various types, such as virus, worm, spam, phishing exploration, spyware, adware, or the like. The threat, no matter how it is categorized, may need to be stopped at various points of a networked computing systems, including at least one or more laptops, desktops, servers, gateways, communication ports, handheld or mobile devices, firewalls, and the like.

The system may provide an IOC infrastructure management, such that the IOC infrastructure can serve to protect computing systems from computer-based malware, including viruses, spyware, adware, Trojans, intrusion, spam, policy abuse, uncontrolled access, and the like. In one example, the system may be any entity with a networked computer-based infrastructure.

In an embodiment, FIG. 1 depicts an exemplary environment 100 for implementing IOC Infrastructure Management System 101, referred as to a system 101 hereinafter, which is communicatively connected to one or more external devices serving as IOC external sources 102 over a network 104. The system 101 is configured to manage IOC infrastructure in order to prevent malware attacks efficiently. The system 101 includes various components described in subsequent descriptions with reference to the figures.

Examples of the network 104 include, without limitation, in accordance with the present embodiment, a Wide Area Network (WAN), the Internet, a mobile telephone network 104 (e.g., CDMA, GSM, NDAC, TDMA, E-TDMA, NAMPS, WCDMA, CDMA-2000, UMTS, 3G, 4G), (e.g., PON), a public network 104, a private network 104, and/or other wired or wireless communications network configured to carry data. Computing devices and networks also may support wireless wide area network (WWAN) communications services including Internet access.

The external sources 102 may be a computing device having a processor, such as including at least one or more laptops, desktops, servers, gateways, communication ports, handheld or mobile devices implemented in personal or entity capacity, such as corporate, commercial, educational, governmental, or the like. The network may be distributed amongst a plurality of computing device and plurality of geographical locations. The malware threat may come from a plurality of sources, such as from network threats, physical proximity threats, secondary location threats, and the like. The computing device may pick up the threat when interfacing with an unprotected server through the Internet. Any computer system 101, which has been compromised due to malware attack may have IOC data defining malware attributes. Such computing system 101 can serve as an external source of the IOCs. A plurality of computing systems 101 or server, without being compromised, may contain IOC database 220 that includes a plurality of IOCs formats and types, IOC attributes, remedial actions, and such IOC related data. Such computing devices can also serve as the IOC external source.

The system 101 mainly includes an IOC processing device 106 and an Endpoint engine 108. The IOC processing device 106 is provided to receive and process raw IOCs and carry out the transition of the raw IOCs into unified IOC format to be stored in a master IOC database. The raw IOCs are sourced from one or more external sources. The IOC defines one or more attributes of one or more security threats. The attributes can include static data, such as a source of the security threat (e.g., a domain, URL, or IP address for the security threat), files associated with the security threat, file characteristics, scripting, regex, and/or other appropriate static characteristics of a security threat. The attributes can also include in-memory signatures, dynamic characteristics, such as based on a behavioural profile, and/or network indicators. The attributes could also include a machine learning model, such as a neural network, support vector machine, or syntax tree which detects one or more threats.

The IOC processing device 106 may specify one or more characteristics of a category of security threats. For example, a category of IOCs may have the same or overlapping characteristics. The IOC processing device 106 may specify one or more characteristics of variants of a particular security threat. For example, the variants may have the same or overlapping characteristics. The IOC processing device 106 can specify an algorithm or set of rules that detects variants of a threat, rather than just as single threat.

The IOC processing device 106 contains data including instructions that, when processed by a processor, cause the computer to detect the presence of the one or more attributes of the threat. For example, when the IOC processing device 106 communicates with an external source that specifies an IP address, the IOC processing device 106 may evaluate event data for one or more computing systems 101 to determine whether the event data includes events related to the IP address, as such a log entry indicating that data was sent to or received from the IP address.

In a further example of the IOC attribute, the IOC processing device 106 can detect a hash function for mapping event data describing events that have occurred at the computing system 101. In this example, when a computer processes the hash function, the hash function may cause the computer to map event data to characteristics of security threats.

Further examples of the IOC attributes may include, but may not be limited to, a registry key name and value, file name created by the particular process, named kernel object, set of strings extracted by PE executable, aggregated metrics of process behaviour, and the like.

The IOC processing device 106 includes components defining one or more rules for identifying IOC attributes in event data describing events that have occurred at the computing system 101. For example, a rule may specify a set of one or more attributes that, if identified in the event data, represent a malware threat. A rule may also specify what portions of the event data may be considered as IOC attribute. For example, the rule may specify that if a particular file name is found in a particular folder, then a particular security threat or attack is present in the computing system 101. A rule can include instructions that, when executed by a computer, cause the computer to detect the presence of one or more attributes specified by the rule in event data for the computing system 101.

The IOC processing device 106 is thereby configured to receive the raw IOCs and identify the IOC attributes describing the security threat. In one embodiment, the raw IOCs can be stored, not necessarily though, at the raw IOC database 112 through raw IOC server 110 temporarily till IOCs are processed. To process the IOCs for creating unified IOC infrastructure, the IOC processing device 106 includes a plurality of parsers, where at least one parser corresponds to at least one format of the IOC, and a rule definition language that enables rule-based IOCs. For example, the language may be a regular expression-based toolset, such as YARA. YARA is a tool designed to help malware researchers to identify and classify malware samples. By using YARA, one can create descriptions of malware families. Each description consists of a set of strings and Boolean expression which determines its logic. The IOC processing device 106 can use parsers to sort the raw IOCs according the format and the language to construct IOCs hierarchy. Using complex YARA rules and regular expression, a syntax tree can be built which defines logic for IOC scanning.

The IOC processing device 106 is configured to facilitate transition of the attributes of raw IOC into attributes of unified IOC format. The IOCs are then added to the master database. The endpoint engine 108 receives IOCs from the IOC processing device 106. The endpoint engine 108 is implemented for executing the data security scanning operation. The endpoint engine 108 is configured to source the updated IOC database from the IOC processing device 106, and compare the system context derived from the scanning process of a computing device under the threat of malware attack. By comparing detected suspicious threat with the known IOC definitions, the system 101 can determine whether or not the malware attack has been made, and take a remedial action against the malware attack accordingly.

Figure 2:
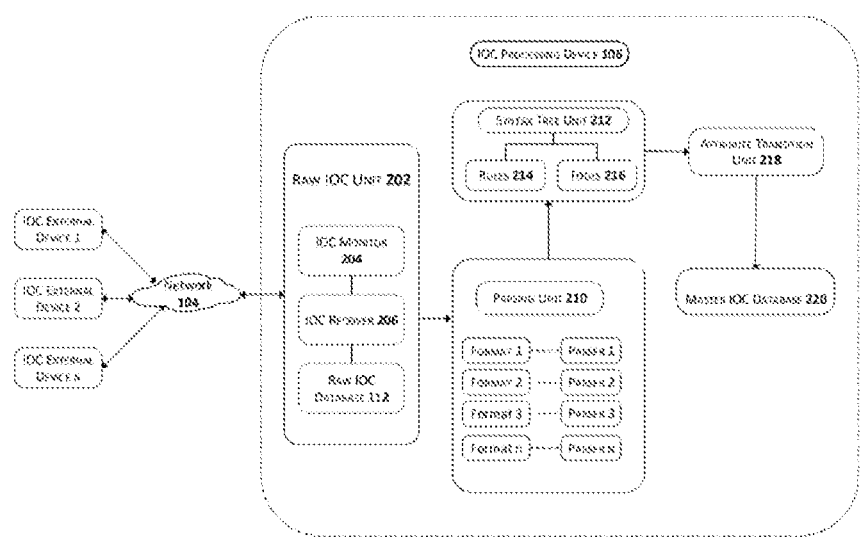
FIG. 2 illustrates a function block diagram of the IOC processing unit of the IOC infrastructure management system, according to an embodiment of the present disclosure.

FIG. 2 describes a functional block diagram of the IOC processing device 106. The IOC processing device, as shown in the figure, mainly includes a raw IOC unit 202, a parser unit 210, a syntax tree unit 212, an attribute transition unit 218, and a master IOC database 220.

The raw IOC unit 202 is configured to identify and receive raw IOC data from a plurality of external sources. The raw IOC unit 202 includes an IOC monitor 204, an IOC receiver 206, and the raw IOC database 112. The IOC monitor 204 is a programmable component that contains descriptors and rules 214 to determine when there is an Indicator of Compromise. The IOC monitor 204 may include a set of rules, circumstances and appropriate information to identify IOC from external devices. The IOC monitor 204 accumulates a sequence of actions, event data, inconsistencies or unexpected behaviour within a group of actions with improved sensitivity by comparing descriptors for various objects involved in relevant actions and events. Thus, the IOC monitor 204 can determine malicious activities. Such data related to the respective IOC can be identified and sourced by the IOC receiver 206. In one example of the implementation, the external devices may be known to the system 101. Such external devices could be a computing device with an IOC database 220. The system 101 can readily source the known IOCs from such databases.

It is to be understood herein that the known IOC database 220 is applicable and effective till the extent of known malware attacks. However, with ever evolving security threat risks, the remedial actions must evolve too. Therefore, the new definitions, attributes, values, types, and such malware attack related data must be stored and analysed to secure the computing devices from such malware attacks. Newly identified IOCs are sourced and added to the IOC database 220.

Once identified by IOC monitor 204, one or more raw IOCs are sourced and received by an IOC receiver 206. The raw IOCs received, may be of same or different formats. In one example, each IOC may have a different format than the IOCs stored in the database. In another example, one or more raw IOCs may have the same format as one or more IOCs stored in the database. Moreover, the raw IOCs may have different attributes than that of the IOCs stored in the database. Therefore, the raw IOCs must be processed, parsed, sorted, and applied with the rules 214 so that the raw IOCs can be normalized and used as a database against which the suspicious IOCs, detected on a user's computing device during the security scan, can be compared and security threat level can be determined and confirmed.

The process of normalization is carried out by the parser unit 210 of the system 101. As discussed above observations made and raw identified IOCs within the system 101 containing malicious software may lead to detection of previously unidentified threats. Normalizing these raw IOCs and determining corrective actions performed to eliminate such threats is required.

The parser unit 210 includes a plurality of parsers, where each parser corresponds to a specific IOCs format. In one example, OSINT feed is supported by Malware Information Sharing Platform (MISP) parser. Malware Information Sharing Platform (MISP) is an open standard for sharing threat intelligence including cyber security indicators. MISP includes a simple and practical information sharing format expressed in JSON that can be used with MISP software or by any other software. MISP supports default attributes (types, categories), objects (advanced combination of attributes), taxonomies (set of already defined classification), and galaxy (method to express a large object that can be attached to events). MISP permits export of indicators to various industry standards formats including OpenIOC, STIX (XML and JSON), CSV, and others.

Another example of the IOC format includes OpenIOC format. OpenIOC is a format for recording, defining, and sharing threat intelligence. It is designed to fill a void that currently exists for organizations that want to share threat information both internally and externally in a machine-digestible format. OpenIOC is an open and flexible standard that can be modified on the fly—it is an extensible XML schema that enables the description of technical characteristics that identify a known threat, an attacker's methodology, or other evidence of compromise. OpenIOC consists of metadata, references, and definitions.

Yet another example of IOC format includes Structured Threat Information Expression (STIX™). STIX is an open source XML programming language used by cyber-security analysts. STIX information can be visually represented for an analyst or stored as JSON to be quickly machine readable. STIX language consists of some key constructs and the relationships between them, that includes Observables describing what has been or might be seen in cyber, indicators describe patterns for what might be seen and what they mean if they are, Incidents describe instances of specific adversary actions, adversary tactics describe attack patterns, malware, exploits, kill chains, tools 216, infrastructure, exploit Targets describe vulnerabilities, weaknesses, or configurations that might be exploited, courses of action describe response actions that may be taken in response to an attack or as a preventative measure.

YARA parser is defined by YARA rules. The YARA parser can support a plurality of external data formats. A syntax tree unit 212 builds a syntax tree for imported IOCs that also supports YARA rules and regular expressions. YARA is one of the most popular IOC formats and a powerful tool that provides a rule-based approach to describe malware families based on textual or binary patterns. It helps malware researchers to identify and detect malware samples. Each description, or rule, consists of a set of strings (equals to attributes in other IOC formats) and a boolean expression which determines its logic. YARA is a multi-platform program running on Windows, Linux and MAC OS X. It requires installation and it comes with built-in modules which can help developers to write complicated rules. In order to use YARA software it has to be installed on endpoint instance. The main advantage of YARA is the existence of convenient built-in modules that allow developers to create complex and sophisticated IOCs rapidly and effectively.

YARA modules include a PE module, an ELF module, a hash module, a math module, a dotnet module. The PE module allows researchers to create more fine-grained rules for portable executable files by using features of the PE file format. This module exposes most of the fields present in a PE header and provides functions which can be used to write more expressive and targeted rules. The ELF module is very similar to the PE module, but for ELF (executable and linkable format) files. This module exposes most of the fields present in an ELF header. The Hash module allows developers to calculate hashes (MD5, SHA1, SHA256) from portions of a file and create signatures based on those hashes. The Math module allows developers to calculate certain values from portions of a file and create signatures based on those results. The dotnet module allows developers to create more fine-grained rules for .NET files by using attributes and features of the .NET file format.

The parser unit 210 and the syntax tree unit 212 convert the raw IOCs into a single unified format and apply syntax rules 214 so that each imported IOC is processed only once and duplication is avoided. The attribute transition unit 218 is configured to sort the converted IOCs to be stored in IOC database 220 according to IOC attribute. Particularly, the IOCs can be sorted lexicographically with respect to the array of attributes. The IOC attribute may be identified as an attribute type ID, attribute value, and attribute condition. The IOCs are sorted lexicographically by comparing the attributes. The attributes are compared by attribute type ID, wherein attribute type IDs of at least two IOCs are not equal, by attribute value, wherein the attribute type IDs of the at least two IOCs are equal and attribute values of the at least two IOCs are not equal, and by attribute condition, wherein the attribute type IDs and attribute values of the at least two IOCs are not equal. By comparing IOC attributes, the IOCs can be sorted lexicographically. The IOC database 220 is updated with Parsed and sorted IOCs. The endpoint engine 108 (shown with reference to FIG. 1) can access the updated database when scanning a system 101 context of a computing system 101 on which the malware detection program is being executed and comparing the known IOCs with suspicious threats found during the scanning.

Figure 3:
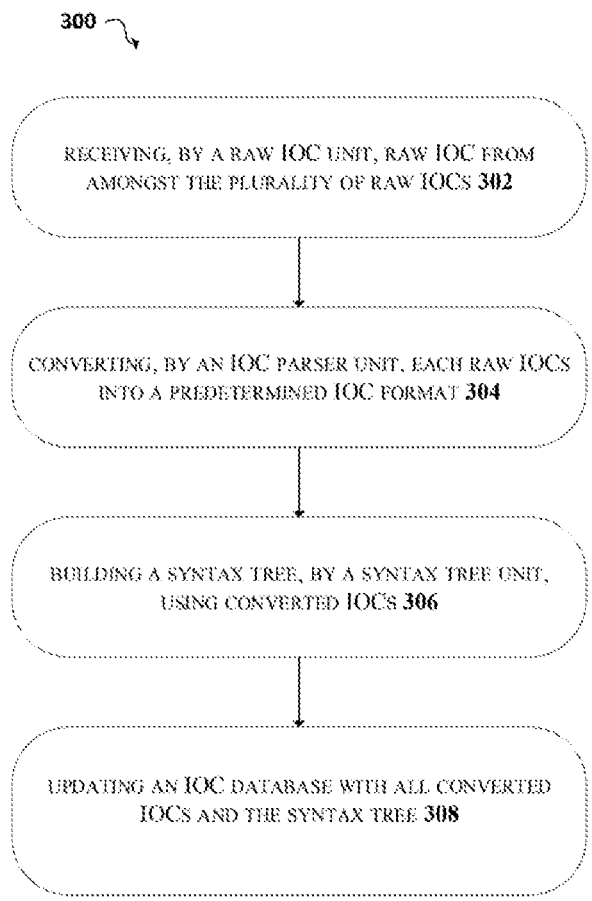
FIG. 3 illustrates a method diagram for implementing the IOC Infrastructure Management System, according to an embodiment of the present disclosure.

FIG. 3 depicts method steps being executed by the system 101 for IOC infrastructure management. The method is implemented by an IOC infrastructure management system 101 on a server. The method is particularly implemented for updating IOC infrastructure by sourcing new IOCs from a plurality of external sources 102 and updating the IOC database 220 accordingly so that when a computing system 101 is scanned for malware detection, any suspicious threat can be compared with the IOCs stored in the IOC database 220 to know the attributes and required corrective remedies for the detected threat. In one implementation, the method steps mainly include a step of receiving 302 raw IOC from amongst the plurality of raw IOCs by a raw IOC unit 202. In one example, each of the raw IOC can be of the same format as any other raw IOCs from amongst the plurality of raw IOCs and/or format of the IOCs stored in the IOC database 220. In another example, raw IOCs can be of different format from any other raw IOCs from amongst the plurality of raw IOCs or format of the IOCs stored in the IOC database 220.

According to the same implementation, further method step includes converting 304 each raw IOCs into a predetermined IOC format by an IOC parser unit 210. As discussed earlier, the IOC attributes may be IOC attributes may vary as per attribute type ID, attribute value, and attribute condition. For faster and effective scanning process, it is of importance that the database is in the same format and are of equal attributes. Therefore, it is ensured at this step that the attributes of the predetermined IOC format are equivalent to attributes of different formats of the raw IOCs. The parser unit 210 comprises one or more parsers, where each parser corresponds to at least one format of IOCs.

In accordance with the same implementation, the method step further includes building a syntax tree 306 using converted IOCs by a syntax tree unit 212. The formats of raw IOCs are converted into the predetermined IOC format which renders the scanning process faster. However, to avoid duplication of any IOC being stored at the IOC database 220, the attributes of the IOCS are compared and IOCs are sorted lexicographically. The syntax tree unit 212 builds a syntax tree that supports complex rules 214 and tools 216, such as a regular expression-based toolset YARA. The rules 214 and expressions are applied to the attributes of the IOCs for sorted, categorising them according to the prioritization of their threat level. The particular method step renders the syntax tree capable of controlling the complexity of IOCs with a set of syntax operators.

According to the implementation of the method, the further method step includes updating 308 a master IOC database 220 with all converted IOCs and the syntax tree. When the IOC formats are converted into the predetermined formats, and new IOCs are parsed and sorted, the IOC database 220 is updated with the new IOCs.

Figure 4:
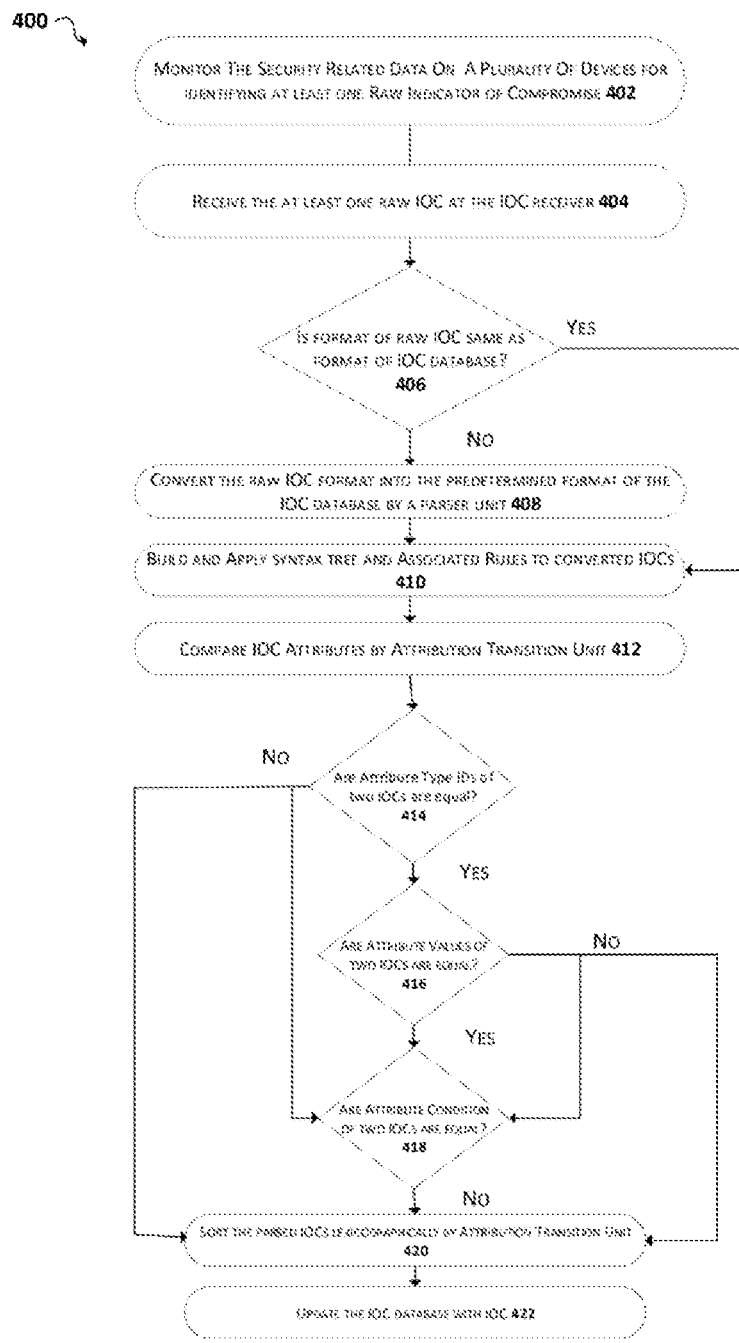
FIG. 4 illustrates a flow diagram of implementation of IOC Infrastructure Management System, according to an embodiment of the present disclosure.

FIG. 4 depicts an exemplary flow chart 400 to implement the method for IOC infrastructure management. The IC monitor is a tool configured to monitor the external sources 102 for suspicious threats. External sources, including computing devices, routers, firewalls, IOC database 220s and such are monitored for the security related data identifying at least one Raw Indicator of Compromise 402. The intention of such monitoring herein is to keep looking for newly formed and structured IOCs and malicious threats and update their definitions in the IOC database 220. When the suspicious threat is identified as a raw IOC, e.g., new and not updated in the IOC database 220 yet, the raw IOC is received 404 at the IOC receiver 206.

The new IOC may be of same format as the predetermined format of the IOC database 220 and other IOCs received at the IOC receiver 206, or in another example, the format of raw IOCs may differ from the predetermined format of the IOC database 220 and other IOCs received at the IOC receiver 206. It is determined that if the format of the raw IOC is different than that of the predetermined format of the IOC database 220 and other IOCs received at the IOC receiver 206 406. If the format of raw IOC is different, the format of the raw IOC is converted 408 into a predetermined format of the IOC database 220 by the parser unit 210. The converted IOCs are applied 410 with syntax rules and tools that may include expression-based toolset YARA rules. Complex rules are applied to the attributes of converted IOCs to sort the IOCs according to their attributes in lexicographical manner. The attribution transition unit compares the IOC attributes. Different classifications of IOC attributes include attribute type ID, attribute value, and attribute condition. The comparison is conducted by attribute type ID, wherein attribute type IDs of at least two IOCs are not equal 414, by attribute value, wherein the attribute type IDs of the at least two IOCs are equal and attribute values of the at least two IOCs are not equal 416, and by attribute condition, wherein the attribute type IDs and attribute values of the at least two IOCs are not equal 418.

Accordingly, the parsed IOCs are sorted lexicographically 420. Converted, parsed and sorted IOCs are updated into the IOC database 220.

It is to be understood that the syntax tree is not merely a set of rules or Boolean expressions, rather it supports the complex expression-based tools and complex syntax rules at attribute level. The application of syntax tree along with the parsing renders the system and method more effective and faster than in the prior art. Duplication of IOCs in the database can be avoided, which further shortens the scanning period.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A method, implemented by an IOC (Indicators of compromise) infrastructure management system on a server, for updating IOC infrastructure, comprising:
   receiving, by a raw IOC unit, at least one raw IOC from a plurality of external sources, wherein each raw IOC from amongst the plurality of raw IOCs is i) in same format as any other raw IOCs from amongst the plurality of raw IOCs, or ii) in different format from any other raw IOCs from amongst the plurality of raw IOCs;
   converting, by an IOC parser unit, each raw IOC into a plurality of converted IOCs in a predetermined IOC format, wherein attributes of the converted IOCs are equivalent to attributes of different formats of the raw IOCs;
   wherein the converting further comprises:
      parsing each of the raw IOCs into a converted IOC, wherein the attributes of the converted IOC are not contained in the other converted IOCs;
      sorting the attributes of the converted IOC;
      storing each IOC in an IOC database;
   building a syntax tree, by a syntax tree unit, using converted IOCs, wherein the syntax tree is configured with a set of syntax operators and regular expressions, wherein each converted IOC is processed once during scanning by an endpoint engine; and
   updating a master IOC database with all converted IOCs and the syntax tree.

2. The method of claim 1, wherein the plurality of raw IOCs in different formats are received from known external sources.

3. The method claim 1, wherein the syntax tree master IOC database supports Yara rules and regular expressions.

4. The method of claim 1, wherein for each format of received IOCs, a corresponding parser is provided which is capable of converting the respective IOC into the predefined IOC format.

5. The method of claim 1, wherein the raw IOCs are based on a system event, network traffic classification, or malware artifact.

6. The method of claim 1, wherein the converted IOCs are sorted lexicographically with respect to an array of attributes, and wherein the attributes are compared:
   by attribute type ID, wherein attribute type IDs of at least two IOCs are not equal;

by attribute value, wherein the attribute type IDs of the at least two IOCs are equal and attribute values of the at least two IOCs are not equal; and by attribute condition, wherein the attribute type IDs and attribute values of the at least two IOCs are not equal.

7. The method of claim 1 further comprising:

collecting a system context of a target computing system, wherein a system context comprises specific contexts for particular computing system entities; and detecting a threat on a target computing system by comparing a system context with the attributes from the updated master IOC database.

8. A system on a server for managing IOC (Indicators of compromise) infrastructure, comprising:

at least one computing device;

IOC processing unit configured for receiving a plurality of raw IOCs from a plurality of external sources via a communication interface, wherein each raw IOC from amongst the plurality of raw IOCs is i) in same format as any other raw IOCs from amongst the plurality of raw IOCs, or ii) in different format from any other raw IOCs from amongst the plurality of raw IOCs;

an IOC parser unit comprising one or more parsers configured for parsing different types of formats for converting each raw IOCs into a plurality of converted IOCs in a predetermined IOC format, wherein attributes of the converted IOCs are equivalent to attributes of different formats of the raw IOCs;

wherein the IOC parser unit is further configured for parsing each of the raw IOCs into a converted IOC, wherein the attributes of the converted IOC are not contained in the other converted IOCs;

a syntax tree unit configured for building a syntax tree using converted IOCs, wherein the syntax tree is configured with a set of syntax operators and regular expressions, such that each converted IOC is processed once when scanned; and a master IOC database updated with all converted IOCs and the syntax tree.

* * * * *